United States Patent [19]

Ellis

[11] 4,203,654
[45] May 20, 1980

[54] LINE-OF-SIGHT STABILIZATION REFLECTOR ASSEMBLY

[75] Inventor: Herbert B. Ellis, La Canada, Calif.

[73] Assignee: The United States of America as represented by the Secretary of the Air Force, Washington, D.C.

[21] Appl. No.: 962,741

[22] Filed: Nov. 21, 1978

Related U.S. Application Data

[63] Continuation-in-part of Ser. No. 850,327, Nov. 10, 1977, abandoned.

[51] Int. Cl.² ............................................. G02B 7/18
[52] U.S. Cl. .................................................... 350/285
[58] Field of Search ................. 350/16, 6.5–6.91, 350/285

[56] References Cited

U.S. PATENT DOCUMENTS

| | | | |
|---|---|---|---|
| 3,544,201 | 12/1970 | Fowler et al. | 350/285 |
| 3,765,631 | 10/1973 | Herbst et al. | 350/16 |
| 3,981,566 | 9/1976 | Frank et al. | 350/285 |

FOREIGN PATENT DOCUMENTS

2557814 4/1977 Fed. Rep. of Germany ............ 350/6.6

*Primary Examiner*—Jon W. Henry
*Attorney, Agent, or Firm*—Joseph E. Rusz; Arsen Tashjian

[57] ABSTRACT

An assembly for stabilizing the line-of-sight to a mirror in an optical system. The assembly includes a gimballed mirror that can be driven in angular rotation, so as to compensate for angular motions of the optical system, which would otherwise deleteriously affect line-of-sight stabilization of and to the mirror. The reflecting surface of the mirror maintains the desired position in the optical system during such driven compensatory rotations, as well as being unaffected by imposed undesired mechanical vibrations. The assembly has a high natural rotational frequency, minimal and uniform pivot friction, a selected degree of damping, uniform performance over the operating temperature range, as well as long life.

4 Claims, 1 Drawing Figure

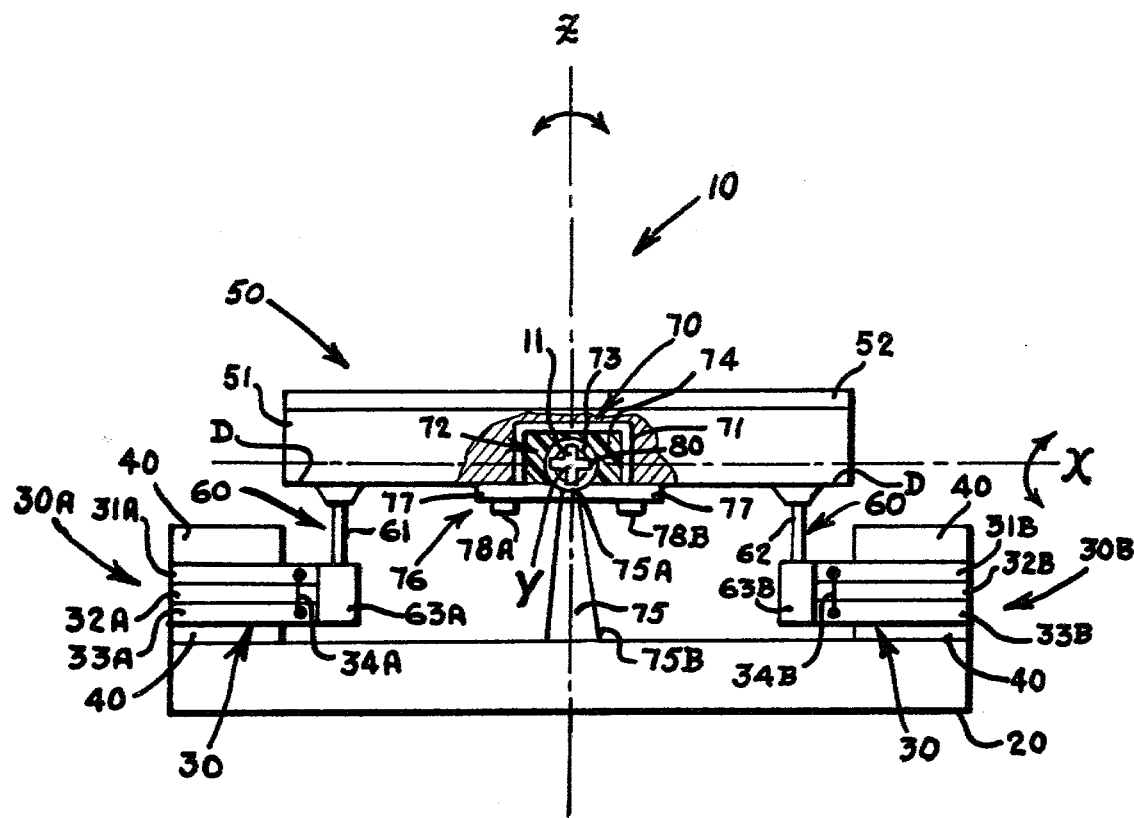

LINE-OF-SIGHT STABILIZATION REFLECTOR ASSEMBLY

STATEMENT OF GOVERNMENT INTEREST

The invention described herein may be manufactured and used by or for the Government for governmental purposes without the payment of any royalty thereon.

CROSS REFERENCE TO RELATED APPLICATION

This application is a continuation-in-part of U.S. patent application Ser. No. 850,327, filed on Nov. 10, 1977 now abandoned.

BACKGROUND OF THE INVENTION

This invention relates to a line-of-sight stabilization optical reflector assembly having a dynamic center of gravity through which pass three orthogonal axes of rotation, wherein, as a matter of preference and not of limitation, said three orthogonal axes comprise a first (Y) axis, a second (X) axis, and a third (Z) axis; and, more particularly, to a mirror (which may be gimballed) that can be driven in angular rotations, so as to compensate for angular motions of an optical system, thereby affecting line-of-sight stabilization.

A need has arisen in the art for an apparatus that will achieve three functional goals, namely: (1) a lightweight, stiff optical reflector, which will maintain its required optical characteristics under the dynamic conditions of the applied vibration environment, as well as the driven compensatory rotations; (2) a rotatable pivot (that may be gimballed) coinciding with the dynamic center of gravity of the apparatus, and providing minimal and uniform pivot friction, a selected degree of damping, and uniform performance and long life; and, (3) an optical reflector driven in compensatory rotational motions, and having a high natural frequency, uniform performance, and long life.

I have invented such an apparatus, in the structural form of a unique assembly; and, thereby, I have significantly advanced the state-of-the-art.

SUMMARY OF THE INVENTION

This invention pertains to a mirror that can be driven in angular rotations, so as to compensate for angular motions of an optical system, thereby effecting line-of-sight stabilization.

Accordingly, the principal object of this invention is to teach the structure of a preferred embodiment of a unique assembly which incorporates such a gimballed mirror.

This principal object, as well as other related objects, of this invention will become readily apparent after a consideration of the description of the invention, together with reference to the drawing.

DESCRIPTION OF THE DRAWING

The drawing, is a side elevation view, partially fragmented, partially in cross section, and in simplified form, both functional and schematic, of a preferred embodiment of my invention.

DESCRIPTION OF THE PREFERRED EMBODIMENT

With reference to the drawing, therein is shown, in simplified form, a preferred embodiment 10 of my invention, a line-of-sight stabilization optical reflector assembly having a dynamic center of gravity 11 through which pass three orthogonal axis of rotation X (i.e., second axis), Y (i.e., first axis) and Z (i.e., third axis).

In its most basic and generic form, the inventive assembly 10 comprises: a base member 20; a plurality 30 of piezoelectric bender elements adjacent to, and in abutting contact with, the base member 20; means 40 for clamping the plurality of piezoelectric bender elements 30 to the base member 20; an optical reflector 50 pivotally connected to the base member 20; and, means 60 for connecting the plurality of piezoelectric bender elements 30 to the optical reflector 50.

More specifically, the optical reflector 50 is by way of preference, rather than because of any limitation, a mirror which, in turn, comprises a welded aluminum honey substrate structure 51, such as is commercially obtainable from Avco Aerostructures Division, Nashville, Tenn., and a plane replicated (i.e., "copied" or "reproduced"), front surface optical mirror surface member 52, such as is commercially available from Tinsley Laboratory, Pasadena, Calif., that is integrated with the welded aluminum honeycomb substrate member 51, to form the optical (reflector) mirror 50.

Additionally, the optical reflector 50 is pivotally connected to the base member 20 by a means, generally designated 70, which includes: a pivot receptacle 71 in the structural form of a hole in the honeycomb substrate member 51; a pivot means 72 which includes a first pivot, preferably a ball, mounted in elastomer-mounted rotatable pivot member 73 fitted into the pivot receptacle 71, and a second pivot member 75 in the structural form of a shaft having a first end 75 A and a second end 75 B, with the first end 75 A connected to the first pivot member 73, and with the second end 75 B connected to the base member 20.

Further, the means 76 for releasably securing the elastomer-mounted first pivot member 73 in the pivot receptacle 71, comprises a clamping means which preferably includes a ring member 77 (or other suitably configured element for holding the first pivot member 73 and the elastomer module 74 in the receptacle 71) removably attached to the substrate 51 by suitable means, such as set screws 78 A and 78 B.

Also, the first pivot member 73 is positioned at the dynamic center of gravity 11 of the assembly 10; is rotatable, in and within the elastomer material mount 74, in each of the three orthogonal axes of rotation X, Y and Z (with the Y axis perpendicular to the plane of the drawing at point 11) which pass through the dynamic center of gravity 11; and, the first pivot member 73, is preferably gimbal-mounted (i.e., gimballed, as represented symbolically by the plurality 80 of crossed, perpendicular frames or rings) in and within the elastomer material mount 74.

In addition, the plurality 30 of piezoelectric bender elements each comprises a pair of the bender elements 30A and 30B, with each bender element comprising, in turn, a three-layer sandwich of a pair (i.e., two) of piezoelectric ceramic wafer members (i.e., 31A and 33A for bender element 30A; and, 31B and 33B for bender element 30B), interposed between which is a central metallic wafer member (i.e., 32A for bender element 30A; and, 32B for bender element 30B). The piezoelectric ceramic wafer members of each bender element (such as 31A and 33A for bender element 30A) are in electrical connection with each other, as schematically represented by a wire conductor (such as 34A for 31A and 33A; and 34B for 31B and 33B), so that an electrical signal that causes one of the pair of piezoelectric ceramic wafer members of bender element (such as 31A of 34A) to bend, flex or the like in one direction (such as down), thereby causes the other one of the pair of piezoelectric ceramic wafer members of that bender element (such as 33A of 34) to bend, flex or the like in the opposite direction (such as up).

Also further, the means 60 for connecting the plurality 30 of piezoelectric bender elements 30A and 30B to the optical reflector 50 includes a plurality of flexible wires, such as 61 and 62, interposed between, and interconnecting, the bender elements 30A and 30B and the substrate structure member 51 of the optical reflector 50. More specifically, each bender element (i.e., each three-layer sandwich) 30A and 30B is attached to a receptacle (63A for 30A; and 63B for 30B) which, in turn, is attached to its respective flexible wire (63A to 61; and, 63B to 62). Also, the connecting means 60 is attached to the under side of substrate 51 of the optical reflector 50 on a diameter "D" that is normal to the axis of rotation Z.

MANNER OF OPERATION OF THE PREFERRED EMBODIMENT

The manner of operation of the preferred embodiment 10 can be easily ascertained by any person of ordinary skill in the art from the foregoing description, coupled with reference to the drawing.

For others, it is sufficient to say in explanation that, as a result of stress (such as an applied voltage, not shown) intentionally applied to the plurality 30 of piezoelectric bender elements, the elements 30A and 30B bend, flex and the like and, through means 60 and flexible elements, such as 61 and 62, the bender 30A and 30B elements impart motion to the optical reflector 50. Conversely, the structure of the inventive assembly 10 is such that externally caused vibrations, which might otherwise cause the unintended and undesired movement of optical reflector 50, are dampened.

CONCLUSION

It is abundantly clear from all of the foregoing, and from the drawing, that the stated desired principal object, as well as other related objects of my invention have been achieved.

It is to be noted that, although there have been described the fundamental and unique features of my invention, as applied to a preferred embodiment thereof, various other embodiments, adaptations, substitutions, additions, omissions, and the like, may occur to, and can be made by, those of ordinary skill in the art, without departing from the spirit of the invention.

What is claimed is:

1. A line-of-sight stabilization optical assembly having a dynamic center of gravity through which pass three orthogonal axes of rotation, wherein said three axes are a first axis, a second axis, and a third axis, comprising:
   a. a base member;
   b. a plurality of piezoelectric bender elements adjacent to, and in abutting contact with, said base member, wherein each piezoelectric bender element includes two piezoelectric ceramic wafer members that are in electrical connection with each other, and a central metallic wafer member that is interposed between said two piezoelectric ceramic wafer members;
   c. means for clamping said piezoelectric bender elements to said base member;
   d. an optical reflector pivotally connected to said base member, wherein said optical reflector is a mirror which comprises:
      (1) a welded aluminum honeycomb substrate structure member;
      (2) and, a plane replicated front surface optical mirror surface member integrated with said welded aluminum honeycomb substrate structure member;
   and wherein said optical reflector is pivotally connected to said base member by a means which includes:
      (1) a pivot receptacle in the form of a hole in said welded aluminum substrate structure member;
      (2) a pivot means which includes a first pivot member mounted in elastomer material and rotatably movable therein, with said elastomer-mounted rotatable first pivot member fitted into said pivot receptacle and positioned at said dynamic center of gravity of said line-of-sight stabilization optical reflector assembly, and a second pivot member in the structural form of a shaft having a first and a second end, with said first end connected to said elastomer-mounted rotatable first pivot member, and with said second end connected to said base member, and wherein said elastomer-mounted rotatable first pivot member is rotatable, in and within said elastomer material mount, in one of said three orthogonal axes of rotation which pass through said dynamic center of gravity of said line-of-sight optical reflector assembly;
      (3) and, means for releasably securing said elastomer-mounted rotatable first pivot member in, and within, said pivot receptacle;
   e. and, means for connecting said plurality of piezoelectric bender elements to said optical reflector.

2. A line-of-sight stabilization optical reflector assembly, as set forth in claim 1, wherein said means for releasably securing said elastomer-mounted rotatable first pivot member in and within said pivot receptacle includes a ring member removably attached to said welded aluminum honeycomb substrate structure member.

3. A line-of-sight stabilization optical reflector assembly, as set forth in claim 2, wherein said means for connecting said plurality of piezoelectric bender elements to said optical reflector includes a plurality of flexible wires interposed between, and interconnecting, said piezoelectric bender elements and said welded aluminum honeycomb substrate member of said optical reflector.

4. A line-of-sight stabilization optical reflector assembly, as set forth in claim 3, wherein said rotatable first pivot member is gimballed in and within said elastomer material mount.

* * * * *